No. 764,847. PATENTED JULY 12, 1904.
J. P. HOLLOPETER.
THILL COUPLING.
APPLICATION FILED APR. 15, 1904.
NO MODEL.
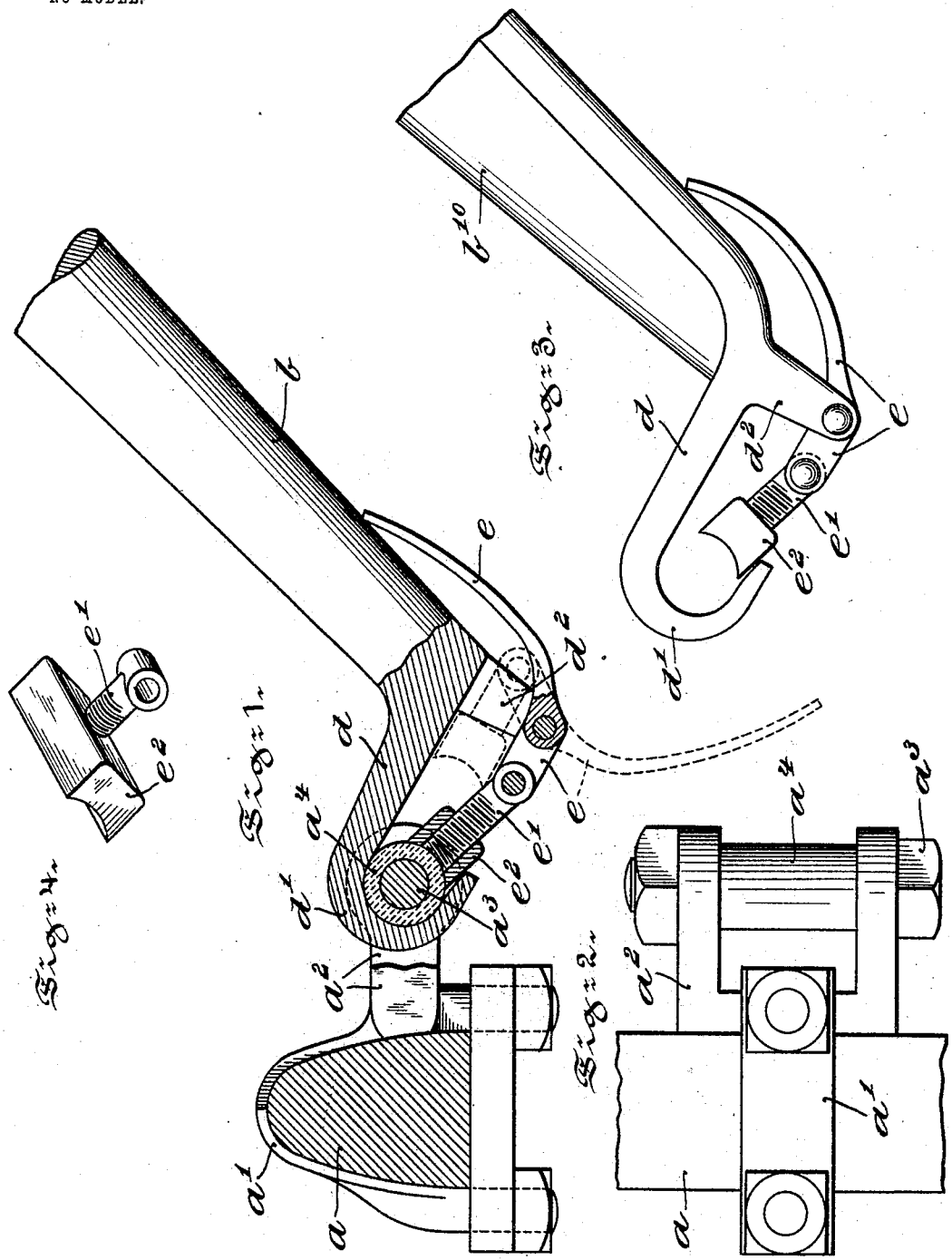

No. 764,847. Patented July 12, 1904.

UNITED STATES PATENT OFFICE.

JOHN P. HOLLOPETER, OF CAMDEN, NEW JERSEY, ASSIGNOR OF ONE-FOURTH TO FRANK W. SHRIVER, OF PHILADELPHIA, PENNSYLVANIA.

THILL-COUPLING.

SPECIFICATION forming part of Letters Patent No. 764,847, dated July 12, 1904.

Application filed April 15, 1904. Serial No. 203,242. (No model.)

*To all whom it may concern:*

Be it known that I, JOHN P. HOLLOPETER, a citizen of the United States, residing at Camden, in the county of Camden and State of New Jersey, have invented certain new and useful Improvements in Thill-Couplings, of which the following is a specification.

My invention has relation to a coupling for detachably securing thills or shafts to the axle of the vehicle; and in such connection it relates to the construction and arrangement of such a thill-coupling.

The principal object of my invention is to provide a thill-coupling of simple construction which may be readily operated to speedily attach or detach the thill to or from the axle and which when in position firmly holds the thill to the axle-iron and prevents rattling.

The nature and scope of my invention will be more fully understood from the following description, taken in connection with the accompanying drawings, forming part hereof, in which—

Figure 1 is a side elevational view, partly in section, of a thill-coupling and auxiliary parts embodying main features of my invention. Fig. 2 is an underneath plan view of the axle and the axle-iron or yoke carrying the bolt to which the thill is attached. Fig. 3 is a side elevational view of a portion of a thill and the thill-coupling, and Fig. 4 is a perspective view illustrating the clamp-block of the thill-coupling.

Referring to the drawings, $a$ represents the axle, and $a'$ the yoke or axle-iron secured to said axle in any suitable manner. The yoke $a'$ carries a bracket $a^2$, in which is detachably supported the thill-bolt $a^3$. By preference the bolt $a^3$ is covered or enveloped with an elastic tube $a^4$, preferably of rubber. To a pole-iron $b$, Fig. 1, or a thill $b^{10}$, Fig. 3, is secured the bracket $d$, having a hooked end $d'$, constituting one of the members of the thill-coupling. The bracket $d$ has an offset $d^2$, forming a fulcrum for a lever $e$, which is pivoted intermediate of its ends in said offset $d^2$. To the inner end of the lever $e$ is pivoted an adjustable pin $e'$, engaging and carrying a clamping-block $e^2$, forming, with the hooked end of the bracket $d$, the means whereby the bracket $d$ is securely clamped to the bolt $a^3$. The outer end of the lever $e$ is formed into a handle or operating-plate. The pin $e'$, with the block $e^2$, is toggled to the inner end of the lever $e$ in such a manner that when the lever $e$ is operated to withdraw the block from the bolt $a^3$ the pin $e'$ is first swung upward toward the bracket $d$ to unlock the block $e^2$ from the bolt, and a further movement of the lever $e$ serves to wholly withdraw the block $e^2$ to permit of the disengagement of the hooked end of the bracket from the bolt $a^3$. This position of the parts is indicated in dotted lines in Fig. 1. When, however, the lever $e$ is operated to lock the hooked end of the bracket $d$ to the bolt $a^3$, then the pin $e'$ and block $e^2$ are first moved toward and upon the bolt $a^3$, and then the pin $e'$ swings downward to securely lock the block $e^2$ to the bolt $a^3$, as well as to force the lever $e$ against the pole-iron $b$ or thill $b^{10}$, as indicated in full lines in Figs. 1 and 3.

Having thus described the nature and object of my invention, what I claim as new, and desire to secure by Letters Patent, is—

1. In a thill-coupling, a thill-bracket having a hooked end adapted to engage the thill-bolt, an offset projecting downward from said bracket, a lever fulcrumed in said offset below the bracket, a clamping-block, and an adjustable pin carrying said block and pivoted to said lever, said block adapted to be pressed inward by the lever against the thill-bolt to coöperate with the hooked end of the thill-bracket to clamp the thill-bracket to said bolt.

2. In a thill-coupling, a thill-bracket having a hooked end, an offset projecting below the bracket, a lever pivoted intermediate of its ends in said offset, a pin pivotally secured to the inner end of said lever, and a block carried by said pin and adjustable thereon.

In testimony whereof I have hereunto set my signature in the presence of two subscribing witnesses.

JOHN P. HOLLOPETER.

Witnesses:
J. WALTER DOUGLASS,
THOMAS M. SMITH.